United States Patent [19]

Jobert et al.

[11] Patent Number: 4,487,163
[45] Date of Patent: Dec. 11, 1984

[54] TOILET FOR CATS AND OTHER SMALL ANIMALS

[76] Inventors: Claude Jobert; Suzanne Jobert, both of "Liffert", 45320 Courtenay, France

[21] Appl. No.: 448,999
[22] PCT Filed: Mar. 22, 1982
[86] PCT No.: PCT/CH82/00043
 § 371 Date: Nov. 22, 1982
 § 102(e) Date: Nov. 22, 1982
[87] PCT Pub. No.: WO82/03151
 PCT Pub. Date: Sep. 30, 1982

[30] Foreign Application Priority Data
Mar. 23, 1981 [FR] France ............... 81 05760

[51] Int. Cl.³ .................................. A01K 23/00
[52] U.S. Cl. .................................................. 119/1
[58] Field of Search ...................................... 119/1

[56] References Cited
U.S. PATENT DOCUMENTS

| 2,971,493 | 2/1961 | Robb | 119/1 |
| 3,332,397 | 7/1967 | Van der Wall | 119/1 |
| 3,752,121 | 8/1973 | Brazzell | 119/1 |
| 4,271,787 | 6/1981 | Wellman et al. | 119/1 |
| 4,278,047 | 7/1981 | Luca | 119/1 |
| 4,308,825 | 1/1982 | Stepanian | 119/1 |
| 4,341,180 | 7/1982 | Cortigene et al. | 119/1 |
| 4,359,966 | 11/1982 | Casino | 119/1 |

Primary Examiner—Hugh R. Chamblee
Attorney, Agent, or Firm—Pennie & Edmonds

[57] ABSTRACT

A disposable toilet for cats and small animals comprising a litter box and a disposable container removably located in the litter box, the container holds an absorption material on the bottom and a drain seated on the absorbing material. Litter material is contained in the drain portion of the container.

9 Claims, 2 Drawing Figures

TOILET FOR CATS AND OTHER SMALL ANIMALS

Toilets for cats and other small animals such as rabbits, guinea pigs, hamsters, etc., usually comprise a box made of a plastics material in which an absorbing layer of granular or other material such as sawdust, sand, sepiolite-type clay granules or even soil is disposed and discarded after use. Sometimes, newspaper or a sheet of plastics material is placed in the box before this absorbing material is introduced, in order to facilitate emptying and cleaning of the box. These solutions are crude and suffer from a number of drawbacks with respect to hygiene and cleanliness. Cats, in particular, have a habit of scattering the soiled contents around the box before leaving the toilet and the noise they make when scratching inside the box is disagreeable. Furthermore, these toilets are ill-smelling, unpleasant to fill with absorbent materials, and even more unpleasant to empty and clean.

The present invention is designed to provide a toilet for cats and other small animals with presents none of these drawbacks, and its object is such a toilet in accordance with claim 1.

The attached Figures depict an example of one embodiment of the toilet in accordance with the invention.

Figure 1:
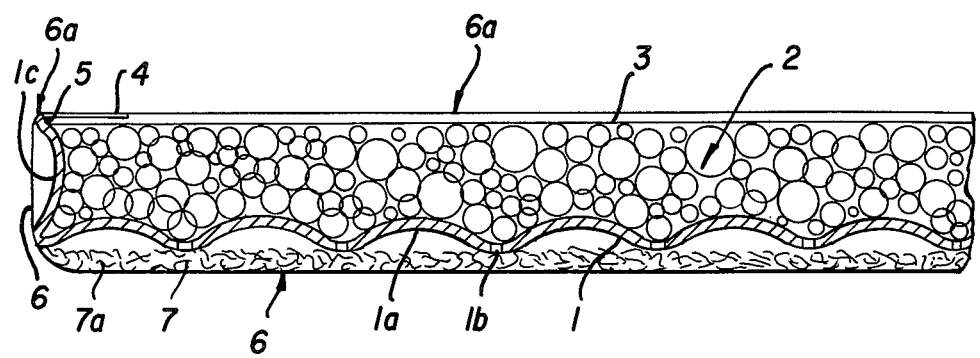
FIG. 1 is a partial view in vertical section.

The toilet illustrated in FIG. 1 comprises a drain 1 made of moulded cardboard, for example, having the shape of a box of which the bottom is embossed as shown at 1a and perforated by numerous holes 1b. The embossing may be in the form of a checker-board, the sides of the individual units being 2.5 cm long. The holes 1b may be situated at the intersections of the straight lines bounding the sides of the individual squares of the checker-board. One of the vertical sides of the box may be seen in 1c.

Within the box there is arranged a litter layer 2 formed by various sized balls of agglomerated cellulose material such as paper, which does not adhere to animal's paws.

The drain 1 rests on a layer 7 of absorbing material for absorbing liquids, consisting preferably of an agglomerate plate which in turn rests on the bottom of a container or envelope 6 made of a material impermeable to liquids, and which is tearproof, scratchproof, "crushable-compactable" and capable of receiving printed instructions or publicity. The plate 7 may be fixed to the bottom of the container by one or several streaks of adhesive as at 7a. This plate may advantageously be made of flakes of cellulose or similar material, with a weight of 180 to 300 g/m² for a thickness of 5 mm, and having received by bath or spraying a deodorant and an antiseptic product.

The drain 1 may be made of soft waxed cardboard, with a weight of 400 to 500 g/m² for a thickness of 5 mm. It may be made from a single sheet, by simple folding. The diameter of the holes 1b may be 3 mm, for example. This drain has the advantage of ensuring rapid evacuation of urine from the litter layer 2, and its distribution and stabilization in the absorbing material 7.

The drain 1 prevents backflow of these evacuated urines, which are then distributed and stabilized in the absorbing board which, being impregnated, eliminates any odours.

The embossing of the drain prevents scattering of the litter. The material of this drain is agreeable to cats' paws and claws and is virtually noiseless, an advantageous feature for persons in the vicinity, especially at night.

The container 6 may be made of the material known under the trade name of "Tyvek", pasted onto a sheet of aluminum, for example. It presents the following advantages:

being impermeable to moisture, it forms a leakproof pouch when handled after use;

being tearproof and scratchproof, it is not damaged by cats' claws;

its ample dimensions (preferably 755 × 655 mm) allow it to fit all standard boxes and provide complete, stable protection. In the closed position before use, which measures 425 × 325 mm, the support guarantees perfect packaging and dimensional stability of the entire product, thus facilitating handling and storage;

being crushable-compactable, it forms, by joining and subsequent "crushing" of the edges, a small, impermeable, definitively sealed pouch which prevents any leakage from the complete used toilet ready for disposal, whatever its position. This operation obviates any contact with the soiled material, and ensures total hygiene and safety;

being printable, it can carry publicity and instructions for use.

The litter layer 2 is maintained in position during storage and transport by a protective film 3, of polyethylene for example, which is glued to the edge 6a of the sides 1c of the drain 1. A tongue 4 allows this film to be detached before use. It is evident from the foregoing that the toilet described forms a prefabricated unit which may be used as such and disposed of in its entirety after use. It presents the following advantages:

it drains the liquids and dries out the excrement;

the litter does not adhere to cats' paws;

it is completely dust free;

its low weight makes it easy to handle by the user and economical for the industrialist (manufacture, transport, storage, etc.);

it has a very low noise level.

The assembly comprising the drain 1, the litter product 2 and the protective film 3 is placed on the container 6 with the absorbing plate 7, which permits packaging of the whole toilet. This is achieved by folding the side walls of the container 6 along its four sides. The two smaller sides are pressed towards the centre first, then the two larger sides which, because of their dimensions, meet. The whole object so formed is then pressed lightly to ensure satisfactory flatness, and finally closed by applying longitudinally over the two edges a printed adhesive strip 9 which is 15 to 20 mm wide having a return of 20 mm at one extremity by which it can be grasped.

The most suitable boxes for storage and transport of litters such as those described are disposable, biodegradable cardboard boxes adapted to the exact dimensions of the "toilets", for which they provide a receptacle, thus obviating the need to buy a container which may not correspond to the dimensions.

Figure 2:
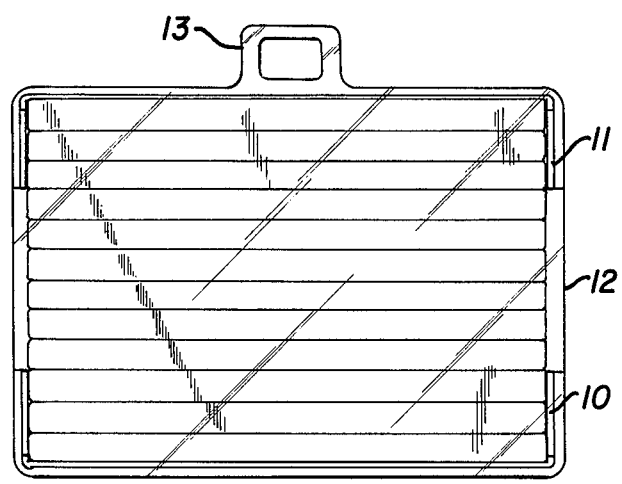
FIG. 2 is a view in vertical section of an assembly of twelve toilets according to FIG. 1, arranged for storage and transport.

FIG. 2 shows two such boxes, 10 and 11, which form a package containing twelve toilets. They may be made of moulded cardboard of 500 to 800 g/m², the first of which, 10 receives the pile of toilets, while the second forms a lid which covers the pile of toilets. These boxes are 8 to 9 cm high for an area corresponding to one toilet unit. They are light, and their manufacturing cost is low and would, in any case, not exceed that of a conventional cardboard package.

The pile so formed is completely enveloped in a heat-sealed polyethylene film 12, provided with a handle 13. This film, being printable, can receive the trade-mark, publicity, and any mandatory data concerning the quality of the product.

The toilet described may be manufactured by the following sequence of operations:

trimming of the soft cardboard destined to form the drain 1 to the required format, and insertion in the so-called upper production line. Embossing of the cardboard 1 according to the sketch 1a, then perforations parallel to the sides as at 1b. Shaping of the cardboard 1 by raising the sides by simple folding. Filling of the drain 1 so formed, which becomes a mould to be filled with the litter product 2 properly so-called, addition of the product and levelling off exactly by raking. Gluing with a streak of adhesive on the upper edge of the drain 1. Covering of the previously printed transparent polyethylene film which is fixed by the streak of adhesive 5, leaving a 15 mm overshoot of the film to provide the tearing tongue 4, before it is finally cut automatically. The tongue 4 is folded back into the interior;

simultaneously, on another production line, flow of the previously printed container 6 on which is positioned the absorbing plate 7 transported by an intermediate chain where it has undergone impregnation by bath or spraying with a deodorant and an antiseptic product. The absorbing plate 7 is fixed to the container 6 by a streak of adhesive 7a;

the two chains meet as the drain 1 is positioned on the container 6. Continuation on the same chain on which the container 6 is folded on the two smaller or transverse sides, then on the two larger or longitudinal sides. The package so formed is lightly pressed and is finally closed by means of a pre-printed adhesive strip 9;

at this stage, the complete toilets are transferred in "packs" of 6, 12, 18 or 24 units to a so-called transverse chain for packaging. Pre-shaped cardboard boxes 10 and 12 are introduced into the chain. The desired number of toilets are placed in the lower box 10, neatly stacked one upon the other, and the upper box 11 is placed over the pile so formed. Then follows the final phase in which the assembly is wrapped in a heat-sealed polyethylene film 12, previously printed and provided with cut-out handles 13.

We claim:

1. A toilet for cats and other small animals comprising:
   (a) reusable litter box having vertical walls and an open top;
   (b) a disposable hand crushable and compactible container of foldable liquid impermeable sheet material sized to fit within the open top of the litter box;
   (c) a layer of absorbing material disposed on the bottom of the container;
   (d) a drain having the shape of a vertically sided opened topped box disposed on said layer of absorbing material and having drainage holes in the bottom thereof communicating with the absorbing material;
   (e) a layer of litter material disposed on said drain; and
   (f) said disposable container, with the layer of absorbing material, the drain and layer of litter contained therein being removable from the litter box as a unit for disposal by joining and crushing together the edges of said foldable material of the container around the absorbing material, drain and litter to form a sealed pouch.

2. A toilet according to claim 1 wherein:
   (a) the foldable material of the container is folded about the drain to define said container.

3. A toilet according to claim 2 wherein:
   (a) the sheet material of the container is folded up around the outside of the sides of the box shaped drain and across the open top thereof until the edges thereof meet to enclose the drain and litter contained therein and form a sealed package for placement within said litter box, said sheet material being foldable into an open container by spreading the edges apart to provide access to the layer of litter in said drain.

4. A toilet according to claim 3 wherein:
   (a) the drain is made of soft cardboard for crushing and compacting upon crushing of the edges of the foldable material of the container in forming said sealed pouch.

5. A toilet according to claim 3 wherein:
   (a) the sheet material of the container is fixed to the upper edge of the drain.

6. A toilet according to claim 5 wherein:
   (a) the edges of the foldable material of the container are sealed together by a removable adhesive strip to define said sealed package.

7. A toilet according to claim 5 further comprising:
   (a) a protective film detachably fixed to the upper edge of the drain and extending across the open top thereof to cover the drain and maintain the litter in place during storage and transport.

8. A toilet according to claim 5 wherein:
   (a) the drain has an embossed bottom with the drainage holes located in the bottom most portions thereof.

9. A package of toilets according to any one of claims 1-4 comprising:
   (a) a plurality of said sealed containers in stacked relation;
   (b) a litter box disposed over each end of said stack; and
   (c) an outer covering enclosing the containers and litter boxes and holding them together in a single package.

* * * * *